United States Patent
Wang et al.

(10) Patent No.: US 10,303,265 B2
(45) Date of Patent: May 28, 2019

(54) OPTICAL MOUSE AND PARAMETER CALIBRATION METHOD THEREOF

(71) Applicant: PIXART IMAGING INC., Hsinchu (TW)

(72) Inventors: Tsung-Fa Wang, Hsinchu (TW); Shih-Wei Kuo, Hsinchu (TW)

(73) Assignee: PIXART IMAGING INC., Hsin-Chu (TW)

( * ) Notice: Subject to any disclaimer, the term of this patent is extended or adjusted under 35 U.S.C. 154(b) by 44 days.

(21) Appl. No.: 15/727,712

(22) Filed: Oct. 9, 2017

(65) Prior Publication Data

US 2018/0267626 A1 Sep. 20, 2018

(30) Foreign Application Priority Data

Mar. 15, 2017 (TW) .............................. 106108545 A

(51) Int. Cl.
| | |
|---|---|
| *G06F 3/039* | (2013.01) |
| *G06F 3/03* | (2006.01) |
| *G06F 3/038* | (2013.01) |
| *G06K 7/14* | (2006.01) |
| *G06F 3/0354* | (2013.01) |
| *G06K 7/10* | (2006.01) |

(52) U.S. Cl.
CPC .......... *G06F 3/0321* (2013.01); *G06F 3/0304* (2013.01); *G06F 3/0308* (2013.01); *G06F 3/039* (2013.01); *G06F 3/0317* (2013.01); *G06F 3/0383* (2013.01); *G06F 3/03542* (2013.01); *G06K 7/10772* (2013.01); *G06K 7/14* (2013.01)

(58) Field of Classification Search
CPC ........................................ G06F 3/0304–3/0395
See application file for complete search history.

(56) References Cited

U.S. PATENT DOCUMENTS

| | | | | |
|---|---|---|---|---|
| 6,303,924 B1 * | 10/2001 | Adan | .................... | G06F 3/0317 250/206.1 |
| 2014/0313132 A1 * | 10/2014 | Chen | .................. | G06F 3/03543 345/166 |

* cited by examiner

*Primary Examiner* — Hang Lin
(74) *Attorney, Agent, or Firm* — Li & Cai Intellectual Property (USA) Office

(57) ABSTRACT

This present invention discloses an optical mouse and a parameter calibration method thereof. The optical mouse includes: a light source, an image capturing unit, a memory unit and a processing unit, and the parameter calibration method of the optical mouse includes: capturing images formed by the reflective light projected from the mouse pad when the optical mouse is placed upon the mouse pad and has a relative displacement between the mouse pad, and then producing image frames according to the images; determining if any pattern information is found in the image frames; further, setting parameters of the optical mouse when at least one of the pattern information is found in the frames, in which, the pattern information is composed of a pattern of the mouse pad.

20 Claims, 4 Drawing Sheets

OPTICAL MOUSE AND PARAMETER CALIBRATION METHOD THEREOF

BACKGROUND OF THE INVENTION

1. Field of the Invention

The present invention relates to an optical mouse; in particular, to an optical mouse and a parameter calibration method thereof, in which the optical mouse can automatically adjust its parameters.

2. Description of Related Art

In conventional designing of an optical mouse, the performances of the optical mouse on different surfaces are usually factored into consideration in order to provide an all-purpose optical mouse. Therefore, it will not be possible for consumers to know whether such an optical mouse is the best match for their mouse pads prior to purchase.

However, since timing is one of the critical factors in deciding game results in competitive gaming, whether the optical mouse employed by the user can achieve optimal performance on his/her mouse pad will decisively affect the outcome of the game. In other words, when gamers buy a gaming optical mouse, the gamers expect the parameters of the gaming optical mouse and the mouse pad to be capable of being set such that the two can match for optimal performance.

SUMMARY OF THE INVENTION

The object of the present invention is to provide an optical mouse and a parameter calibration method thereof. The optical mouse can be controlled with precision by automatically setting corresponding optimized parameters according to a type of a mouse pad surface.

In order to achieve the aforementioned objects, according to an embodiment of the present invention, a parameter calibration method of an optical mouse is provided. The optical mouse includes: a light source, an image capturing unit, a memory unit and a processing unit. The light source is used to provide a light to project the light onto a mouse pad on which the optical mouse is placed against. The image capturing unit is used to generate multiple image frames according to multiple corresponding images which are formed by the reflective light from the corresponding mouse pad, and the image capturing unit captures the images with a capturing frequency. The memory unit is used to store multiple pattern information. The processing unit, coupled with the image capturing unit and the memory unit, is used to process the image frames.

Steps of the parameter calibration method of the optical mouse include: capturing the images formed by the reflective light in a period of a relative displacement and then generating the image frames according to the images when the optical mouse is placed against the mouse pad and moves relative to the mouse pad; determining if any pattern information is found in the image frames; and setting parameters of the optical mouse when at least one of the pattern information is found in the image frames. Meanwhile, the pattern information found in the image frames is formed by a pattern of the mouse pad.

In order to achieve the aforementioned objects, according to another embodiment of the present invention, an optical mouse is provided. The optical mouse includes: a light, an image capturing unit, a memory unit and processing unit. The light source is used to provide a light so as to project the light to a mouse pad on which the optical mouse is placed against. The image capturing unit is used for generating a plurality of image frames according to corresponding images formed by the reflective light from the corresponding mouse pad, and the capturing unit has a capturing frequency. The memory unit is used to store a plurality of pattern information. Further, the processing unit coupled to the image capturing unit and the memory unit is used to process the plurality of image frames. Furthermore, parameters of the optical mouse are set when at least one of the pattern information is in the image frames, the image frames being generated according to the images which are formed by the reflective light when the optical mouse placed on the mouse pad moves relative to the mouse pad. At the same time, the pattern information found in the image frames is formed by a pattern of the mouse pad.

The optical mouse and the parameter calibration method thereof of the present invention can assist a user to set the parameters of the optical mouse automatically with an optimized parameters setting, thereby adapting/matching the optical mouse with the surface type of the mouse pad. Therefore, by automatically setting the parameters of the optical mouse, the optical mouse and the parameter calibration method thereof of the present invention can enhance the performance of the optical mouse when moving on different mouse pad surfaces.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

The present invention provides embodiments of an optical mouse and a parameter calibration method thereof. Mainly, the optical mouse will automatically generate image frames according to images which are formed by a reflective light projected from the optical mouse when the optical mouse is placed against a mouse pad and moves relative to the mouse pad. The optical mouse will determine whether any of a plurality of pattern information stored in the optical mouse is found in the image frames, and then set an optimized parameter setting thereof according to the corresponding pattern information. That is, when the optical mouse determines that at least one of the pattern information is found in the image frames, the optical mouse will proceed with an automatic parameter calibration of the optical mouse. Furthermore, the automatic parameter calibration of the optical mouse adopts the parameter calibration method of the present invention.

Figure 1:
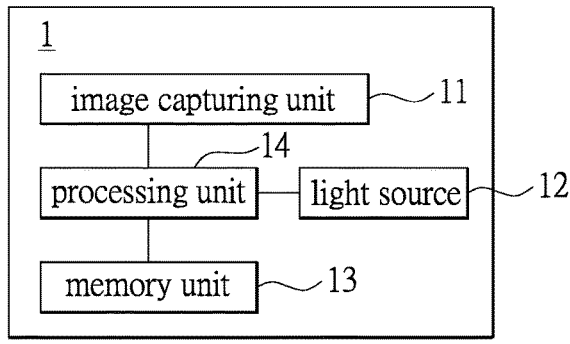
FIG. 1 shows a block diagram of an optical mouse according to an embodiment of the present invention.

Referring to FIG. 1, FIG. 1 shows a block diagram of an optical mouse according to an embodiment of the present invention. In this embodiment, the optical mouse 1 includes an image capturing unit 11, a light source 12, a memory unit 13 and a processing unit 14. The image capturing unit 11, the light source 12 and the memory unit 13 are coupled with the processing unit 14 respectively. In another embodiment of the present invention, the light source 12 can be controlled by other circuits and not be directly connected with the processing unit 14. That is, the connection relation of the light source 12 of the present invention is not limited.

In the embodiment, the image capturing unit 11 is used to capture a plurality of images which are formed by a reflective light projected by the optical mouse 1 according to a capturing frequency to generate multiple image frames. Specifically, the mentioned image is an analog image signal. When the image is converted by an appropriate circuit or an analog-to-digital converter (ADC), the image will be transformed into the corresponding image frame belonging to a digital signal.

In the embodiment, the image capturing unit 11 can be fulfilled by a charge-couple device (CCD) image sensor or a complementary metal oxide semiconductor (CMOS) image sensor. Those skilled in the art can employ the CCD image sensor or CMOS image sensor, to which the present invention is not limited, according to actual requirements.

The light source 12 shown in FIG. 1 is used to generate a light to project the light onto a mouse pad on which an optical mouse is placed (or other pad surfaces). In the embodiment, the light source 12 is controlled by the processing unit 14, in which the processing unit 14 can control the light source 12 by a corresponding conditional parameter to extend or shorten the glowing period, or to increase or reduce the glowing strength. Furthermore, the processing unit 14 can adjust an exposure value of the optical mouse 1 by controlling the glowing period or glowing strength of the light source 12.

In the embodiment, the light source 12 can be formed by a single lighting element or a plurality of lighting elements. Therefore, the lighting element can be a light-emitting diode (LED), a laser diode (LD), or so on.

The memory unit 13 shown in FIG. 1 is used to store multiple pattern information. In the embodiment, the multiple pattern information stored in the memory unit 13 are default pattern information and will be compared with each image frame to determine whether corresponding pattern information is found on the mouse pad (or a pad surface), in which any corresponding pattern information found on the mouse pad would be composed of a pattern of the mouse pad surface (or the pad surface). More specifically, the pattern of the mouse pad surface (or the pad surface) can be a barcode, a logo, a grain/texture, a color, and so on. More details on this aspect will be introduced in FIG. 3, FIG. 4, FIG. 5A, FIG. 5B, FIG. 6A, FIG. 6B and FIG. 6C.

In the embodiment, the memory unit 13 can be a volatile memory or a non-volatile memory, in which the volatile memory can be a random access memory (RAM), and the non-volatile memory can be a flash memory or a read-only memory (ROM). However, the present invention is not limited thereto.

In FIG. 1, the processing unit 14 of the embodiment is used to process the image frames. Furthermore, the behavior of the processing unit 14 is in accordance with the image frames to analyze the pattern of the image frames (e.g., brightness, a barcode, a logo, a grain/texture, a color, or various indexes of the image frames, such as average brightness, maximum brightness, a gray scale ratio of the image frames, etc.) so as to generate a corresponding pattern value. Additionally, the processing unit 14 can also proceed with a comparison behavior, executing such as a parameter automation calibration program of the optical mouse 1 to compare the pattern information found in the corresponding image frames or the pattern value thereof with the default pattern information or default pattern values thereof stored in the memory unit 13. The behavior of the processing unit 14 of the present invention is not limited thereto.

In the embodiment, the processing unit 14 can be a microprocessor, such as digital signal processor (DSP).

In one embodiment of the present invention, the processing unit 14 uses an algorithm to convert the pattern information found in the image frame into the corresponding pattern value and compare the corresponding pattern value with the default pattern values. In this embodiment, the processing unit 14 refers to a parameter mapping table, such as Table 1, for analysis and determination. When the processing unit 14 finds that the pattern value matches with at least one of the default pattern values in Table 1, the optical mouse 1 will automatically set corresponding default parameters according to the default pattern value as current parameters of the optical mouse 1.

TABLE 1 parameter mapping table

| Default Pattern Information | Default Pattern Value | Default Parameters of the optical mouse |
|---|---|---|
| Default Barcode A | 31125 | Exposure value: 17, Aperture value: 23, Image Analyzing Efficiency: 35% |
| Default Barcode B | 645273 | Exposure value: 60, Aperture value: 35, Image Analyzing Efficiency: 85% |
| . | . | . |
| . | . | . |
| . | . | . |

Table 1 is an exemplary parameter mapping table. The parameter mapping table, a pattern information, a pattern value, parameters corresponding to the specific pattern value, and so on in Table 1 will be recorded as default data, in which the parameters of the optical mouse include: an exposure value, an aperture value and an image analyzing efficiency, and so on. However, the default data stored in the memory unit 13 of the optical mouse 1 can be displayed in other aspects in addition to the table format. More details about the exemplary pattern information will be discussed with FIG. 3, FIG. 4, FIG. 5A, FIG. 5B, FIG. 6A, FIG. 6B and FIG. 6C.

Further, in one embodiment of the present invention, when the optical mouse 1 is calibrating the parameters thereof, if the optical mouse 1 cannot find any pattern information (i.e. a predetermined barcode) corresponding to the default pattern information on the mouse pad surface, the optical mouse 1 will try to find the approximate pattern information from the mouse pad surface instead. Optionally, the optical mouse 1 can automatically select a matching (optimized) set of the parameters of the optical mouse 1 by capturing the pattern information of the mouse pad.

It is worth mentioning that the optical mouse 1 can further consider a trigger timing before the optical mouse 1 executes the parameter automation calibration program. The trigger timing can include: being triggered when the optical mouse 1 detects a specific input operation (e.g., pressing a specific combination of buttons) from the operation interface; being triggered when a computer connected with the optical mouse executes parameter calibration software; or triggering automatically when a performance efficiency of the optical mouse 1 is lower than a default value (e.g., via an algorithm to synthesize all conditions to process the performance efficiency and estimate whether the performance efficiency is lower than the default value), in which the optical mouse 1 can further use a light signal displayed on a housing of the optical mouse to indicate that the optical mouse 1 is executing the parameter automation calibration program. It will be appreciated that the skilled person in the art would know that in addition to features of the parameter calibration of the optical mouse 1, the optical mouse 1 would also include all the general features of an optical mouse, such as input control and other basic functions and hardware structure.

Figure 2:
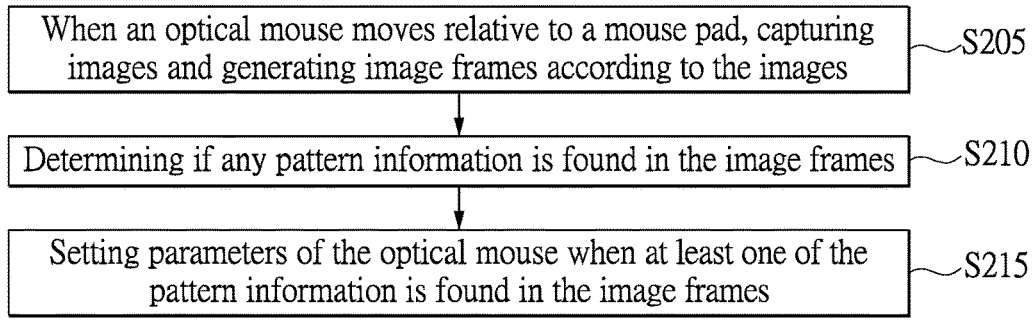
FIG. 2 shows a flow chart describing a parameter calibration method of the optical mouse according to another embodiment of the present invention.

FIG. 2 shows a flow chart describing a parameter calibration method of the optical mouse according to another embodiment of the present invention.

In the embodiment of the parameter calibration method of the optical mouse, a step S205 is executed firstly. When the optical mouse 1 is moving on the mouse pad, the optical mouse 1 will capture images to generate image frames. In detail, in the step S205 of the parameter calibration method of the optical mouse 1, the optical mouse 1 is placed against the mouse pad and moving relative to the mouse pad. Further, the optical mouse 1 captures images formed by a reflective light when the optical mouse 1 moves relative to the mouse pad to generate new image frames according to the images.

Further, in step S210, the optical mouse 1 determines if the aforementioned image frames have corresponding pattern information. In this step, the optical mouse 1 determines whether the aforementioned image frames have the corresponding pattern information, and decides whether to continue to step S215.

Finally, in step S215, when the optical mouse 1 determines that the image frames have the corresponding pattern information, the optical mouse 1 resets the parameters of the optical mouse 1. In more detail, the optical mouse 1 follows step S210. That is, after determining that the image frames has at least one corresponding pattern information, the optical mouse 1 uses the parameters of the optical mouse 1 corresponding to the pattern information to set the current parameters of the optical mouse 1.

In the embodiments of the present invention, the step of determining whether the (default) pattern information is found in the image frames is important. FIG. 3, FIG. 4, FIG. 5A, FIG. 5B, FIG. 6A, FIG. 6B and FIG. 6C will further illustrate other exemplary embodiments according to the pattern information. It will be appreciated that this present invention is not limited thereto.

Figure 3:
FIG. 3 shows an exemplificative diagram of a barcode of the parameter calibration method of the optical mouse.

FIG. 3 shows an exemplificative diagram of a barcode of the parameter calibration method of the optical mouse. In the embodiment, the pattern information can be a barcode 31. The barcode mentioned in this embodiment is formed in an arrangement in accordance with certain coding rules, such as aligning a plurality of white lines and black lines respectively having the same or different widths. The barcode is a graphic identification element and used to present a set of information. Common barcodes are parallel lines having black bars (dark areas) and white bars (bright areas) with significant difference in reflectance.

It is worth mentioning that the determination of a black bar or a white bar is according to the strength of the light signal (strong or weak reflective light) received by the optical mouse 1, and the optical mouse 1 then converts the strong or weak reflective light (the light signal) into a corresponding electrical signal. Further, the width difference of the white bar or of the black bar originates from a length of the corresponding electrical signal duration. For example, determining the number of black bars and white bars by measuring a number of electrical signals 0, 1; determining the widths of the bar and the blank by measuring the duration of the signals 0, 1.

Reference is made to FIG. 3 together with Table 1. In the embodiment, the electrical signals 0, 1 represent dark and bright respectively. The processing unit 14 reads the time periods of the dark area and the bright area of the barcode 31 (ratios of durations are respectively 3 (bright):1 (dark):1 (bright):2 (dark):5 (bright)) to form the barcode 31; that is, the pattern information is found in the image frames. Further, after reading the barcode 31, the processing unit 14 also obtains a corresponding pattern value: 31125. Therefore, the optical mouse 1 will follow a parameter mapping table such as Table 1 to find the parameters of the optical mouse 1 corresponding to the pattern value to proceed with the parameter calibration of the optical mouse 1 automatically. For example, the default barcode A in the Table 1 has the corresponding default pattern value: 31125. Therefore, the optical mouse 1 can map by the pattern value from Table 1 to set the optical mouse 1 with the corresponding default parameters of the optical mouse 1.

Figure 4:
FIG. 4 shows an exemplificative diagram of a Logo of the parameter calibration method of the optical mouse.

FIG. 4 shows an exemplificative diagram of a logo of the parameter calibration method of the optical mouse. In the embodiment, the pattern information can be a logo 32. The optical mouse 1 can employ image recognition to compare every image frame captured with the default pattern information (e.g., the logo 32). When the optical mouse 1 determines that at least one of the image frames is found to map the default pattern information (e.g., the logo 32), the optical mouse 1 will refer to a parameter mapping table such as Table 1 to find the parameters of the optical mouse 1 corresponding to the default pattern information (e.g., the logo 32) to proceed with the parameter calibration of the optical mouse 1 automatically. It is appreciated that the logo 32 can also map with a corresponding pattern value, and the optical mouse 1 will find the corresponding parameters of the optical mouse 1 by mapping the pattern value. The present invention is not limited thereto.

Figure 5A:
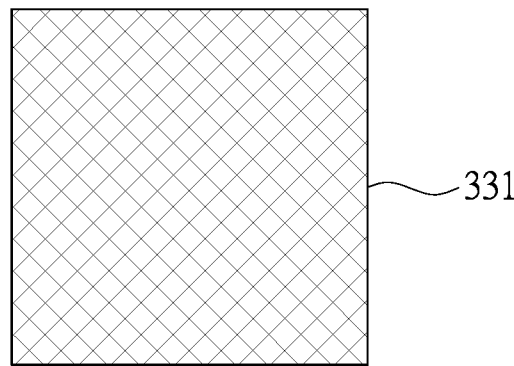
FIG. 5A and FIG. 5B show exemplificative diagrams of a grain/texture of mouse pad surfaces of the parameter calibration method of the optical mouse.
Figure 5B:
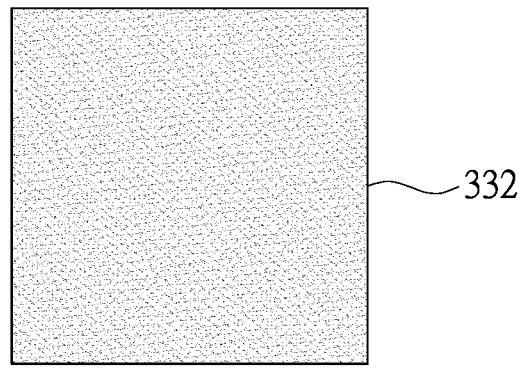

FIG. 5A and FIG. 5B show exemplificative diagrams of a grain/texture of mouse pad surfaces of the parameter calibration method of the optical mouse 1. In the embodiment, the pattern information can be surface textures 331, 332 of mouse pads.

The surface texture 331 of the mouse pad (i.e. a texture) shown in FIG. 5A is of a cloth texture with evident woven patterns, such that the optical mouse 1 can recognize this specific weave as one kind of pattern information.

The surface texture 332 of the mouse pad (i.e. a grain) shown in FIG. 5B is of a leather texture with evident leather patterns, such that the optical mouse 1 can recognize this leather pattern as another kind of pattern information.

Figure 6A:
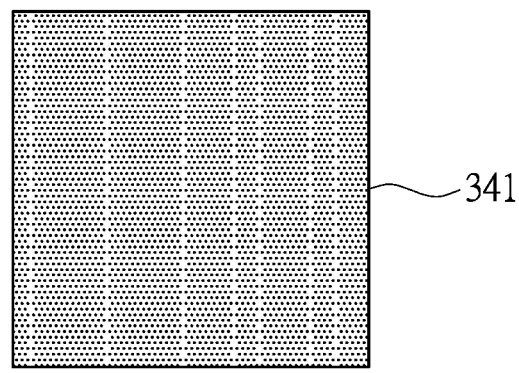
FIG. 6A, FIG. 6B and FIG. 6C show exemplificative diagrams of colors of mouse pad surfaces of the parameter calibration method of the optical mouse.
Figure 6B:
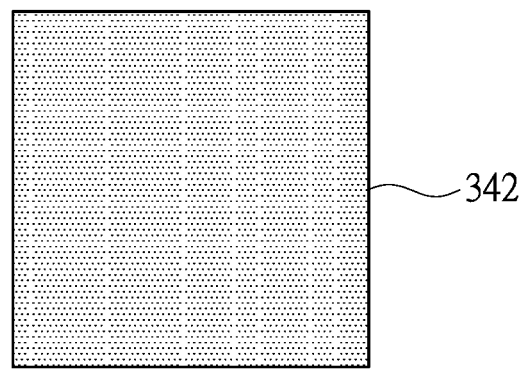
Figure 6C:
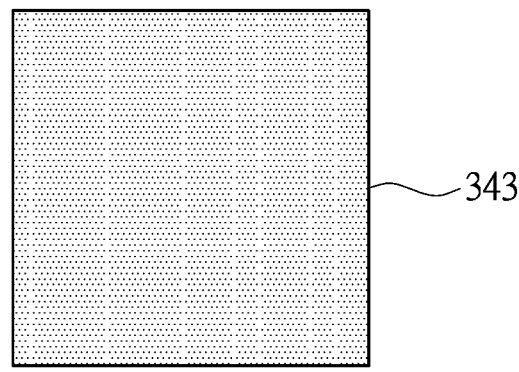

FIG. 6A, FIG. 6B and FIG. 6C show exemplificative diagrams of colors of mouse pad surfaces of the parameter calibration method of the optical mouse. In the embodiment, the pattern information can be surface colors 341, 342, 343 of mouse pads.

In FIG. 6A, FIG. 6B and FIG. 6C, each of the surface colors 341, 342, 343 represents one of a purple color, a brown color and an orange color. In more detail, the surface color 341 is a shade of purple having a brightness of 64; after gray scaling, a gray degree of the surface color 341 corresponds to 64. The surface color 342 is a shade of brown having a brightness of 128; after gray scaling, a gray degree of the surface color 342 corresponds to 128. Further, the surface color 343 is a shade of orange having a brightness of 192; after gray scaling, a gray degree of the surface color 343 corresponds to 192. That is, the surface colors 341, 342, 343 can produce different pattern information for recognition.

It is worth mentioning that the pattern information can also be patterns that are formed by lights or shadows cast upon the mouse pad.

Therefore, in one embodiment of the present invention, default pattern information of an optical mouse can also include any of the aforementioned pattern information or combinations thereof to proceed with the parameter calibration method of the present invention.

Figure 7:
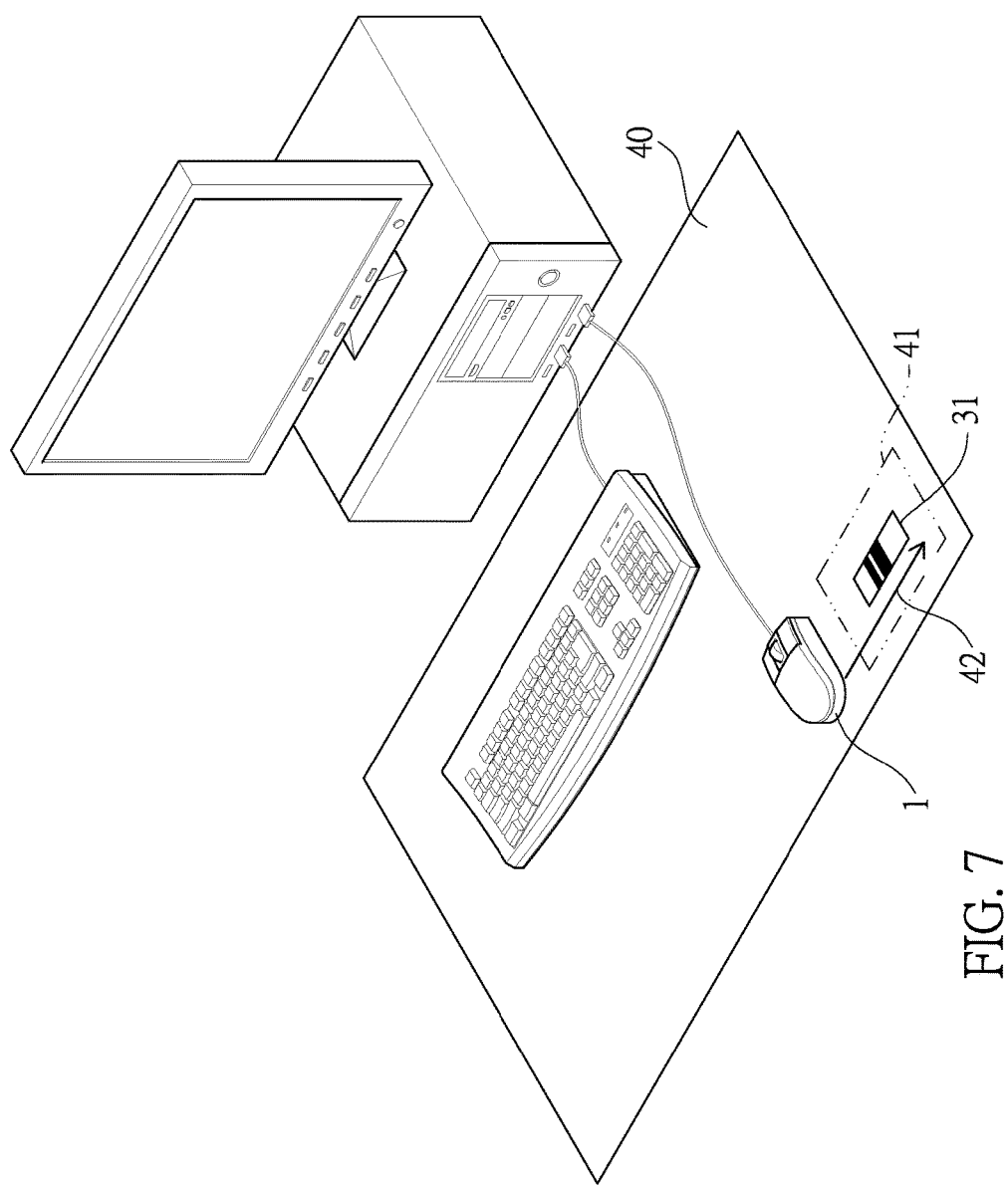
FIG. 7 shows an exemplificative diagram of an application of the parameter calibration method of the optical mouse.

FIG. 7 shows an exemplificative diagram of an application of the parameter calibration method of the optical mouse.

FIG. 7 illustrates a user with a newly assembled gaming computer. After installing the optical mouse 1, the user proceeds with an automatic parameter calibration of the optical mouse 1. In the embodiment, the optical mouse 1 will set the parameter calibration of the optical mouse in accordance with the pattern information found on a mouse pad 40 with a corresponding (optimized) set of parameters. Further, the pattern information of the mouse pad 40 is distributed to a calibration area 41 upon the mouse pad 40 in which the pattern information is the barcode 31. When the user starts to calibrate the optical mouse 1, the user holds the optical mouse 1 and moves the optical mouse 1 in a direction 42, from a left side to a right side, to read the pattern information of the barcode 31. After that, the optical mouse 1 finds a corresponding set of the parameters of the optical mouse 1 (e.g., exposure value: 17, aperture value: 23, image analyzing efficiency: 35%) which represents that the mouse pad 40 has a glossy surface according to the pattern value: 31125 of the barcode 31, which is the pattern information found on the mouse pad 40.

In this case, the optical mouse 1 acknowledges that the pattern of the surface of the mouse pad 40 is the glossy surface and has a better reflection condition via analyzing a pattern of the surface of the mouse pad 40 in accordance with the image frames. Therefore, the optical mouse 1 will proceed with a corresponding adjustment with the corresponding default parameters of the optical mouse 1 in accordance with the received pattern information, and then the optical mouse 1 will decrease the exposure value and the aperture value accordingly. Since the optical mouse 1 will be receiving a large amount of reflective light from the mouse pad 40 of FIG. 7, a lower image analyzing efficiency for processing pattern information can be used in this instance. As aforementioned, the optical mouse 1 of FIG. 7 needs only an image analyzing efficiency of 35%. Consequently, the optical mouse 1 provided by the present invention is power-efficient.

Conversely, the optical mouse 1 can recognize that a matted surface of the mouse pad 40 would have a worse reflection condition by analyzing a pattern of the surface of the mouse pad 40 in accordance with the image frames. Therefore, the optical mouse 1 will proceed with a corresponding adjustment with the corresponding default parameters of the optical mouse 1 in accordance with the received pattern information, and then increase the exposure value and the aperture value accordingly.

To sum up, the optical mouse and the parameter calibration method thereof provided by the embodiments of the present invention can facilitate users to set the optical mouse with a set of parameters that most matches each different mouse pad. That is, the optical mouse and parameter calibration method thereof of the present invention can provide effects such as raising the high speed of the optical mouse, increasing the positioning accuracy and adjusting the most matching (optimized) lift cut-off (or LOD) in accordance with the pattern information of different mouse pads (or pad bodies). Therefore, the present invention is advantageous in that it can reduce power consumption to lower energy wastage based on the parameters of the optical mouse adjusted according to each kind of pattern information.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A parameter calibration method for an optical mouse, in which the optical mouse has a light source used for producing a light onto a mouse pad on which the optical mouse is placed, an image capturing unit used for capturing a plurality of images from a corresponding reflective light of the mouse pad according to an image capturing frequency so as to generate a plurality of image frames, a memory unit used for storing multiple pattern information, and a processing unit coupled to the image capturing unit and the memory unit and used for processing the image frames, comprising the steps of:

when the optical mouse is placed against the mouse pad and moves relative to the mouse pad, capturing the images formed by the reflective light in a period of a relative displacement and then generating the image frames according to the images;

determining if any pattern information is found in the image frames; and setting parameters of the optical mouse when at least one of the pattern information is found in the image frames;

wherein, the pattern information found in the image frames are formed by a pattern of the mouse pad.

2. The parameter calibration method for an optical mouse according to claim 1, wherein determination of whether any pattern information is made in the image frames is according to a barcode which is formed sequentially by time periods of bright or dark areas of the image frames along a sliding direction of the optical mouse, and wherein the multiple pattern information are multiple default barcodes, so that when the barcode matches with any of the default barcodes, the parameters of the optical mouse are calibrated to match corresponding default parameters of the default barcode.

3. The parameter calibration method for an optical mouse according to claim 1, wherein, when at least one of the image frames matches a pattern information representing that a surface of the mouse pad is a glossy surface, the parameters of the optical mouse are calibrated by reducing an exposure value of the optical mouse or decreasing a computing performance for processing image feature comparison of the optical mouse.

4. The parameter calibration method for an optical mouse according to claim 3, wherein, the exposure value of the optical mouse is reduced by shortening a glowing period of the light source or weakening a glowing strength of the light source.

5. The parameter calibration method for an optical mouse according to claim 1, wherein, when at least one of the image frames matches a pattern information representing that a surface of the mouse pad is a matted surface, the parameters of the optical mouse are calibrated by increasing an exposure value of the optical mouse or raising a computing performance for processing image feature comparison of the optical mouse.

6. The parameter calibration method for an optical mouse according to claim 5, wherein, the exposure value of the optical mouse is increased by extending a glowing period of the light source or increasing a glowing strength of the light source.

7. The parameter calibration method for an optical mouse according to claim 1, before the step of creating the image frames, further including a step of:
triggering a parameter automation calibration program when a specific input operation created by an operation interface of the optical mouse is detected.

8. The parameter calibration method for an optical mouse according to claim 1, before the step of creating the relative displacement, further including a step of:
triggering a parameter automation calibration program when parameter calibration software executed by a computer that is connected with the optical mouse is detected.

9. The parameter calibration method for an optical mouse according to claim 1, before the step of creating the relative displacement, further including a step of:
triggering a parameter automation calibration program when a performance efficiency is detected as being lower than a default value;
wherein, a light signal is displayed on a housing of the optical mouse to indicate that the optical mouse is executing the parameter automation calibration program.

10. The parameter calibration method for an optical mouse according to claim 1, wherein the pattern information are at least one of a barcode, a logo, a grain or texture of the mouse pad, and a color of the mouse pad.

11. An optical mouse, comprising:
a light source used for creating a light to project the light to a mouse pad on which the optical mouse is placed;
an image capturing unit used for capturing a plurality of images from a corresponding reflective light of the mouse pad according to an image capturing frequency so as to generate a plurality of image frames;
a memory unit used for storing multiple pattern information; and
a processing unit coupled to the image capturing unit and the memory unit and used for processing the image frames;
wherein, parameters of the optical mouse are set when at least one of the pattern information is found in the image frames, in which the image frames are generated according to the images which are formed by the reflective light when the optical mouse placed on the mouse pad moves relative to the mouse pad;
wherein, the pattern information found in the image frames are formed by a pattern of the mouse pad.

12. The optical mouse according to claim 11, wherein determination of whether any pattern information is in the image frames is made according to a barcode which is formed sequentially by time periods of bright or dark areas of the image frames along a sliding direction of the optical mouse, and wherein multiple pattern information are multiple default barcodes, so that when the barcode matches with any of the default barcodes, the parameters of the optical mouse are calibrated to match corresponding default parameters of the default barcode.

13. The optical mouse according to claim 11, wherein, when at least one of the image frames matches a pattern information representing that a surface of the mouse pad is a glossy surface, the parameters of the optical mouse are calibrated by reducing an exposure value of the optical mouse or decreasing a computing performance for processing image feature comparison of the optical mouse.

14. The optical mouse according to claim 13, wherein, the exposure value of the optical mouse is reduced by shortening a glowing period of the light source or weakening a glowing strength of the light source.

15. The optical mouse according to claim 11, wherein, when at least one of the image frames matches a pattern information representing that a surface of the mouse pad is a matted surface, the parameters of the optical mouse are calibrated by increasing an exposure value of the optical mouse or raising a computing performance for processing image feature comparison of the optical mouse.

16. The optical mouse according to claim 15, wherein, the exposure value of the optical mouse is increased by extending a glowing period of the light source or increasing a glowing strength of the light source.

17. The optical mouse according to claim 11, wherein a trigger timing for the processing unit to execute a parameter automation calibration program comprises:
triggering the parameter automation calibration program when a specific input operation created by an operation interface of the optical mouse is detected.

18. The optical mouse according to claim 11, wherein a trigger timing for the processing unit to execute a parameter automation calibration program further comprises:
triggering the parameter automation calibration program when parameter calibration software executed by a computer connected with the optical mouse is detected.

19. The optical mouse according to claim 11, wherein a trigger timing for the processing unit to execute a parameter automation calibration program further comprises:
triggering the parameter automation calibration program when a performance efficiency is detected as being lower than a default value
wherein, a light signal is displayed on a housing of the optical mouse to indicate that the optical mouse is executing the parameter automation calibration program.

20. The optical mouse according to claim 11, wherein the pattern information are at least one of a barcode, a logo, a grain or texture of the mouse pad, and a color of the mouse pad.

* * * * *